United States Patent [19]

Schindel et al.

[11] 4,130,194

[45] Dec. 19, 1978

[54] APPARATUS FOR ERECTING AND ALIGNING ARTICLES

[75] Inventors: Hugo Schindel, Saulheim; Karl Mecks, Gau-Odernheim, both of Germany

[73] Assignee: Rationator-Maschinenbau GmbH, Hillesheim, Germany

[21] Appl. No.: 838,087

[22] Filed: Sep. 30, 1977

[30] Foreign Application Priority Data

Nov. 11, 1976 [DE] Fed. Rep. of Germany ....... 2651495

[51] Int. Cl.$^2$ ............................................. B65G 47/24
[52] U.S. Cl. ..................................... 198/397; 221/169
[58] Field of Search ............... 198/390, 391, 392, 393, 198/396, 397, 453, 454; 221/167, 168, 169, 171, 172, 173

[56] References Cited

U.S. PATENT DOCUMENTS

| | | | |
|---|---|---|---|
| 3,295,659 | 1/1967 | Aidlin | 221/169 X |
| 3,650,368 | 3/1972 | Nalbach | 198/397 |
| 3,662,872 | 5/1972 | Nalbach | 198/397 |

Primary Examiner—Evon C. Blunk
Assistant Examiner—James L. Rowland
Attorney, Agent, or Firm—Kurt Kelman

[57] ABSTRACT

Elongated articles are randomly received through the open top of a housing in which an inclined disc is rotatably mounted. The disc has a circumferential edge adjacent the housing and the edge defines equidistantly spaced openings capable of permitting article to pass therethrough into shafts associated therewith and descending therefrom. A stationary annular support plate is mounted in a plane immediately below the plane of the disc and in registry with the openings, the support plate defining an opening at the zenith of the disc for permitting communication between a respective one of the openings in the circumferential disc edge and the shaft associated therewith. This shaft has a perpendicular axis whereby the randomly received articles gravitate to the nadir of the disc, are revolved by the rotating disc to the zenith while supported in the openings on the annular support plate and pass sequentially through the opening at the zenith into the shaft while being erected therein. A horizontal elongated conveyor receives the sequentially erected articles from the shaft at the zenith and transports them in alignment away from the shaft.

10 Claims, 16 Drawing Figures

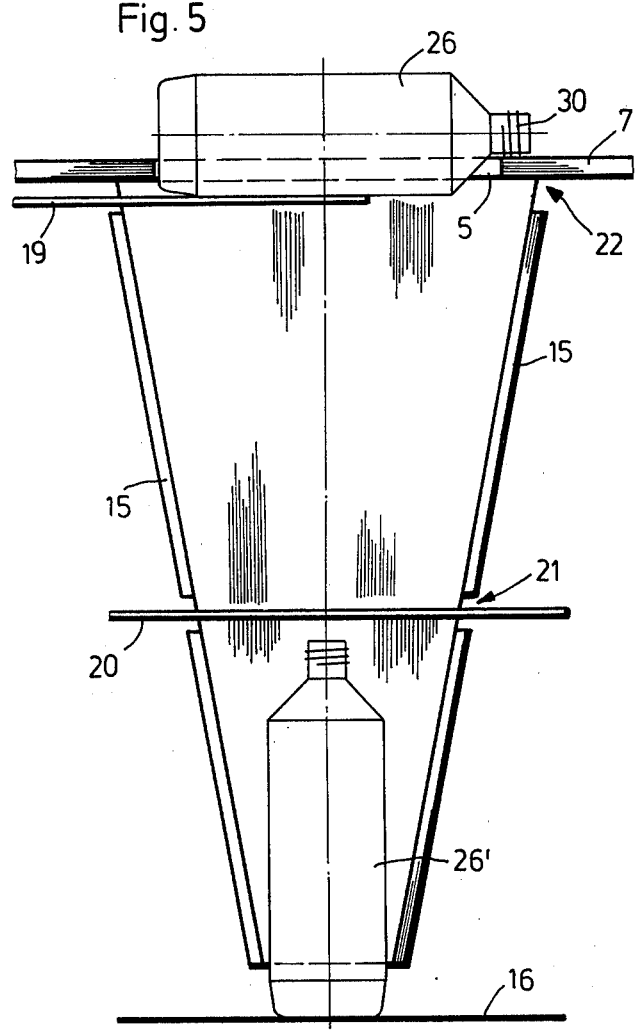
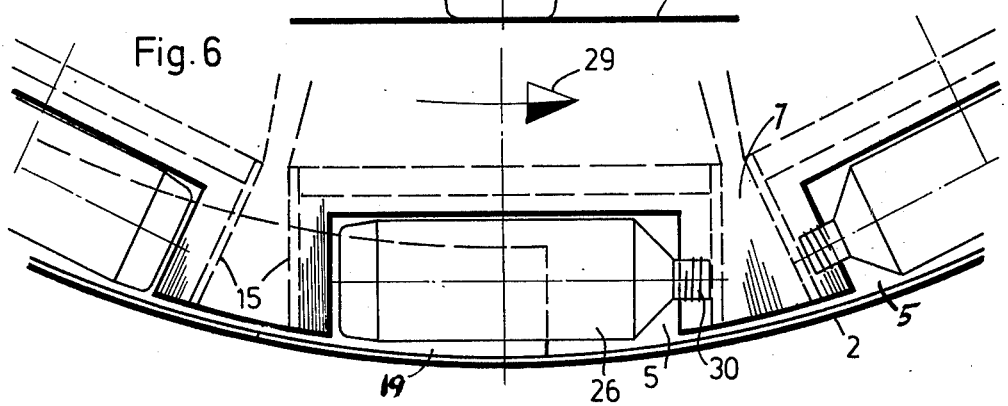

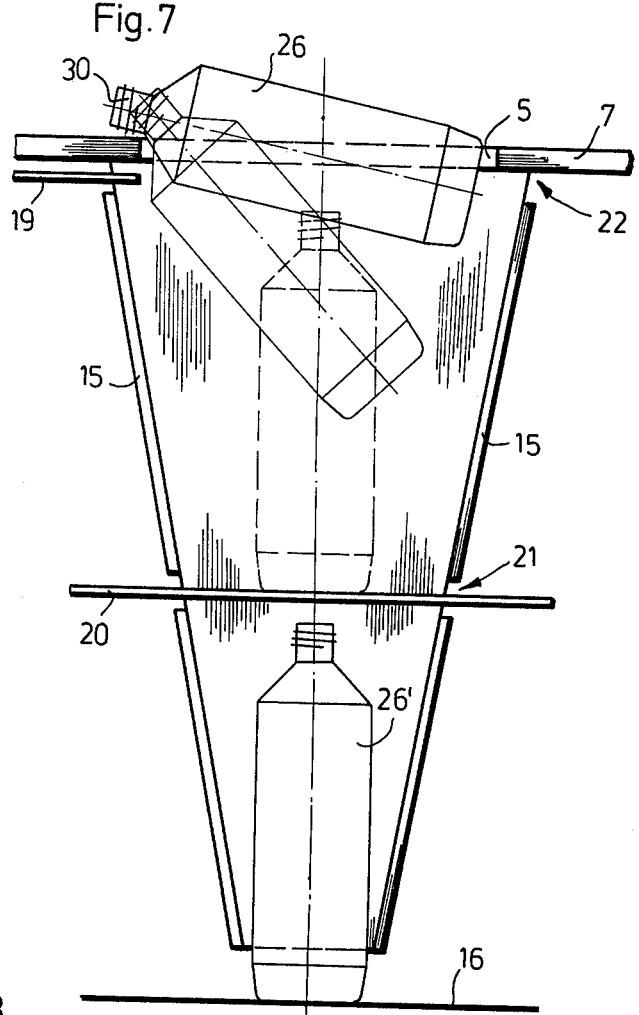
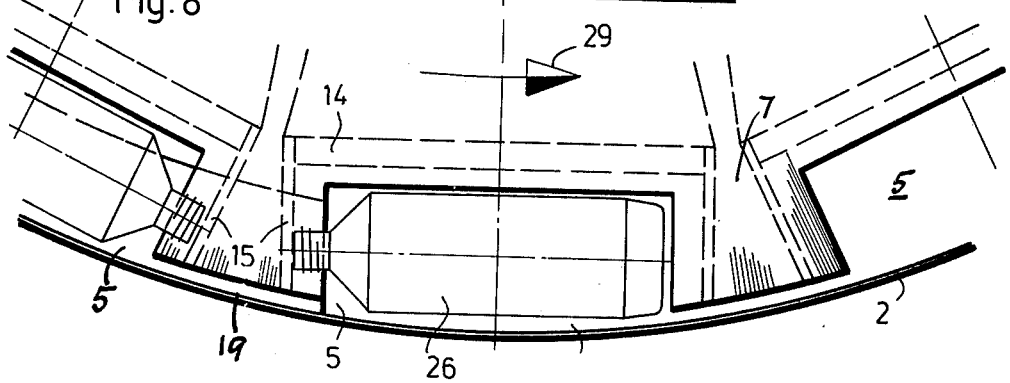

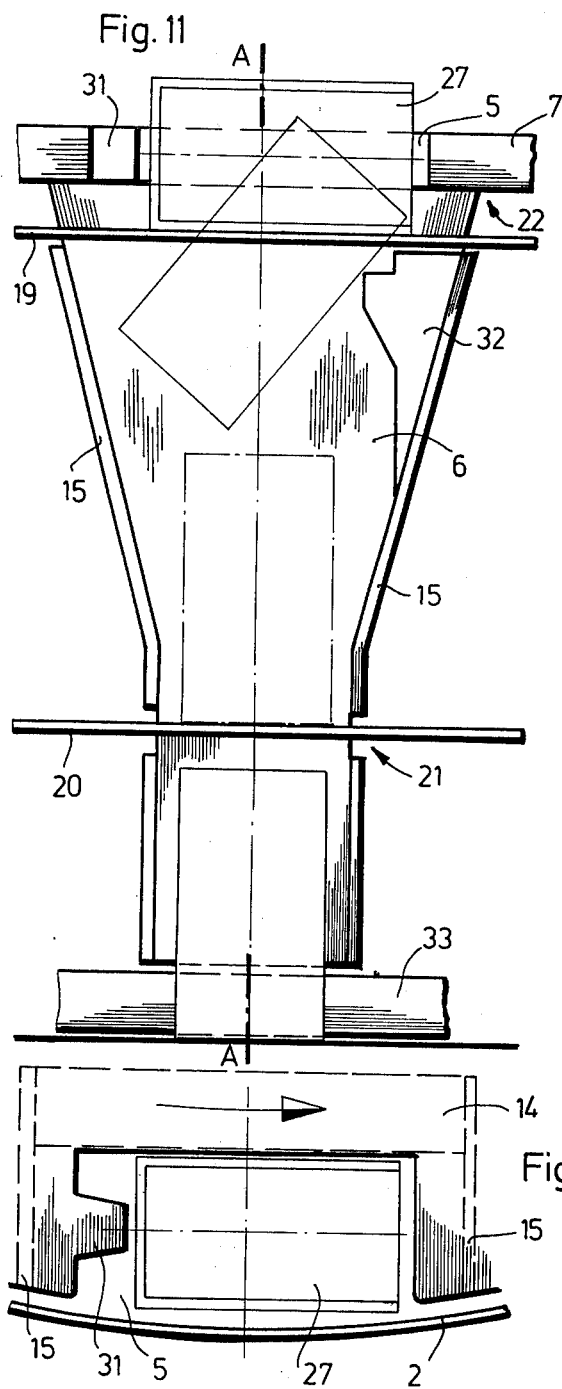
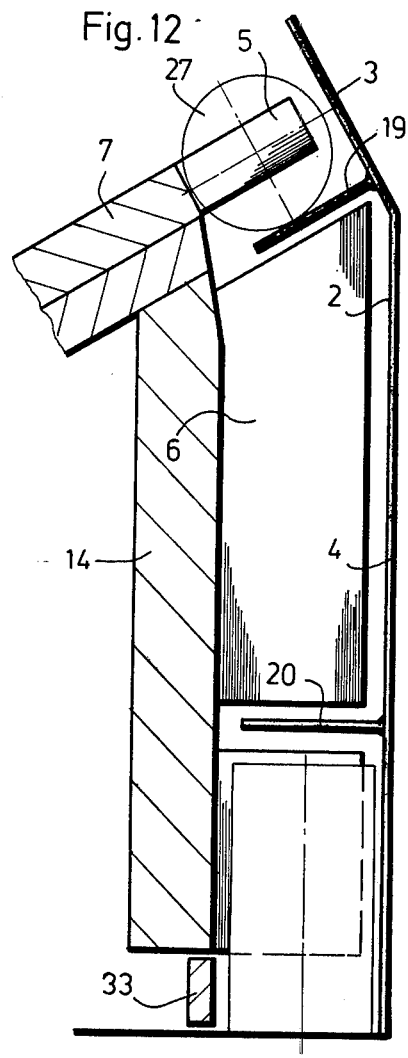
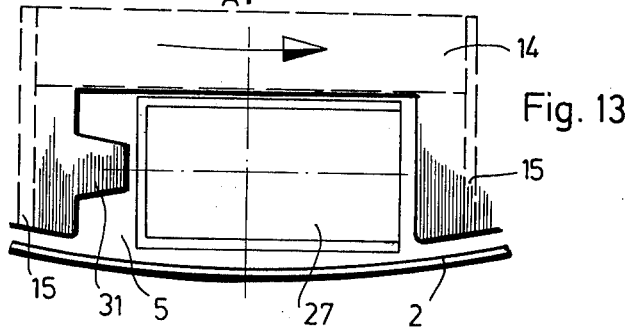

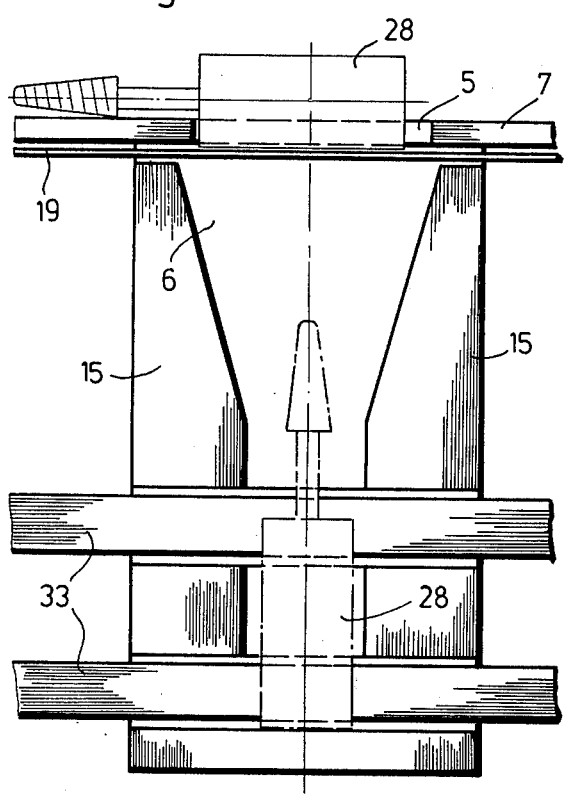
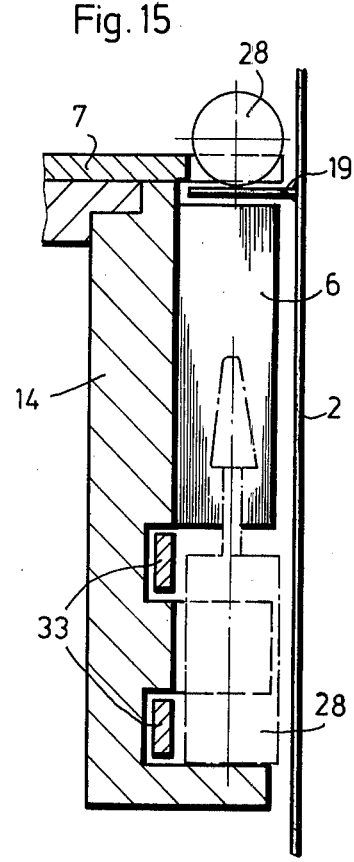
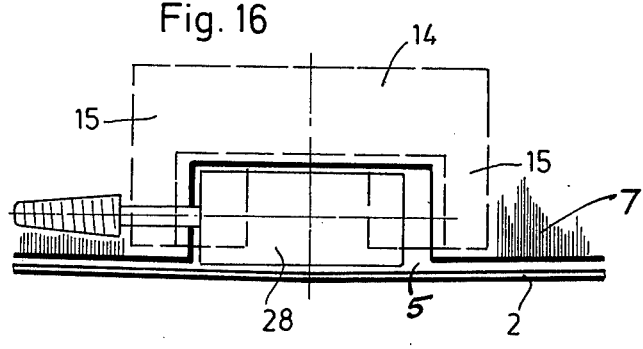

APPARATUS FOR ERECTING AND ALIGNING ARTICLES

The present invention relates to an apparatus for erecting elongated shaped articles, such as bottles, cans and elongated articles of various shapes and sizes, and for aligning the erected articles.

U.S. Pat. No. 3,690,437, dated Sept. 12, 1972, for example, discloses an apparatus of this type wherein the articles are charged into a funnel-shaped hopper and are conveyed out of the hopper on parallel conveyors on which the articles lie. The articles are then erected and the erected articles are gravitationally fed through perpendicular shafts onto horizontal supports where they are aligned. This apparatus cannot be adapted to different sizes of articles and, at most, can work with two shapes. In addition, it has a multiplicity of moving parts which wear and must be frequently repaired and/or replaced. Also, the arrangement is such as to be prone to malfunctioning in the erection of the articles. Furthermore, the erected articles are deposited directly on the collecting conveyor band, the guide disclosed in the patent for moving the erected articles onto the conveyor band frequently causing the same to be pushed over. A commercially efficient apparatus of this type can be built only at considerable expense.

It is the primary object of this invention to avoid these and other disadvantages and to provide an apparatus which can handle elongated articles of various heights, diameters and shapes.

It is a concomitant object of the invention to provide such an apparatus which is simple in construction and functions dependably.

The above and other objects are accomplished in accordance with present invention with an apparatus which comprises a housing defining an open top for randomly receiving a multiplicity of the elongated shaped articles. A disc is mounted in the housing for rotation about an inclined axis of rotation whereby the disc extends in a plane enclosing an angle with the horizontal and the rotating disc has a zenith and nadir. The disc has a circumferential edge adjacent the housing and the edge defines openings capable of permitting the articles to pass therethrough, and shafts associated with the openings and descending therefrom. A stationary annular support plate is mounted in a plane immediately below the plane of the disc and in registry with the openings in the circumferential edge of the disc, the annular support plate defining an opening at the zenith for permitting communication between a respective opening in the circumferential disc edge and the shaft associated therewith. The associated shaft at the zenith has a perpendicularly extending axis whereby the randomly received articles gravitate to the nadir, are revolved by the rotating disc to the zenith while supported in the openings on the annular support plate and pass sequentially through the opening at the zenith into the shaft while being erected therein. A generally horizontally extending elongated conveyor means receives the sequentially erected articles from the shaft at the zenith and transports them in alignment away from the shaft.

The above and other objects, advantages and features of the present invention will become more apparent from the following detailed description of certain now preferred embodiments thereof, taken in conjunction with the accompanying drawing wherein FIG. 1 is a side elevational view of one embodiment of the apparatus of this invention;

FIG. 5 is an enlarged side view of a gravity transfer shaft for a bottle;

FIG. 6 is a top view of FIG. 5;

FIG. 7 is a view similar to that of FIG. 5, showing a subsequent operational stage;

FIG. 8 is a top view of FIG. 7;

FIG. 11 is a view similar to that of FIG. 9, the can being turned 180°;

FIG. 12 is a section along line A—A of FIG. 11;

FIG. 13 is a top view of FIG. 11;

FIG. 14 is a view similar to that of FIGS. 5 and 9 but showing yet another embodiment of a gravity transfer shaft adapted for handling a brush attached to a screw cap;

FIG. 15 is an axial section of FIG. 14; and

FIG. 16 is a top view of FIG. 14.

Figure 1:
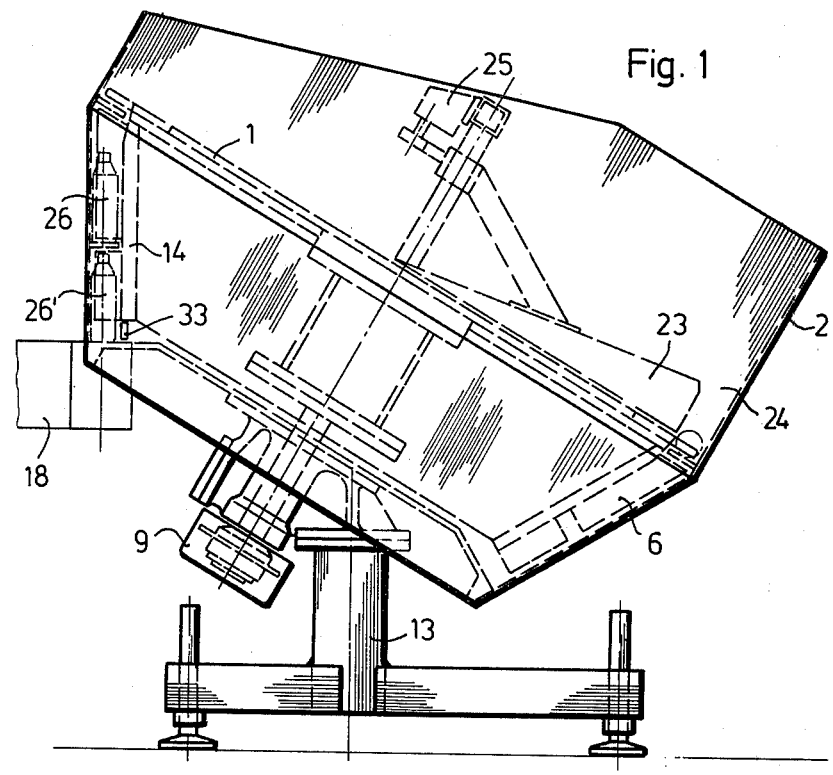
Figure 2:
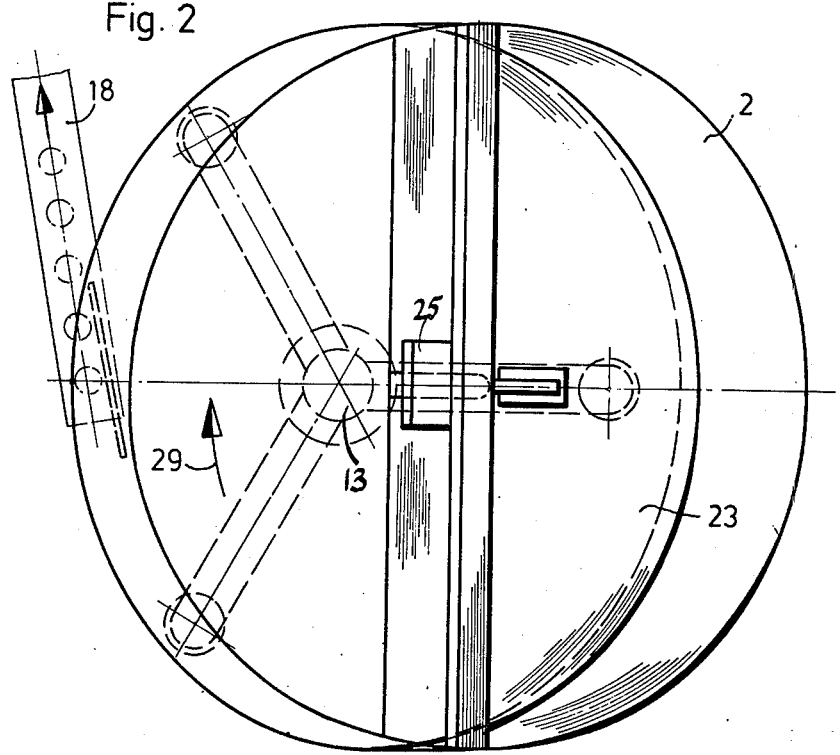
FIG. 2 is a top view thereof.

Referring now to the drawing and first to FIGS. 1 to 8, the illustrated apparatus for erecting and aligning articles comprises a housing 2 wherein there is mounted obliquely inclined, rotating disc 1. Housing 2 consists essentially of cylindrical housing portion 3 which is open on top and extends above disc 1 coaxially with the axis of rotation of the disc, and funnel-shaped housing portion 4 extending below the disc and also coaxial with the axis of rotation thereof. The rotating disc is mounted in a plane separating top housing portion 3 from bottom housing portion 4 and its circumference is adjacent the housing wall. The circumference of disc 1 defines equi-distantly arranged openings 5 for receiving articles delivered randomly into housing 2 through the open top thereof, which articles gravitate towards the pit or nadir defined between the lower part of obliquely inclined disc 1 and are entrained by the disc rotating in direction 29 towards the highest point or zenith of the disc. Article transfer shafts 6 are in communication with openings 5 and project downwardly therefrom into bottom housing portion 4. The shape and length of article receiving openings 5 will be described hereinafter in connection with the different embodiments of the apparatus designed for handling articles of different shapes.

Figure 3:
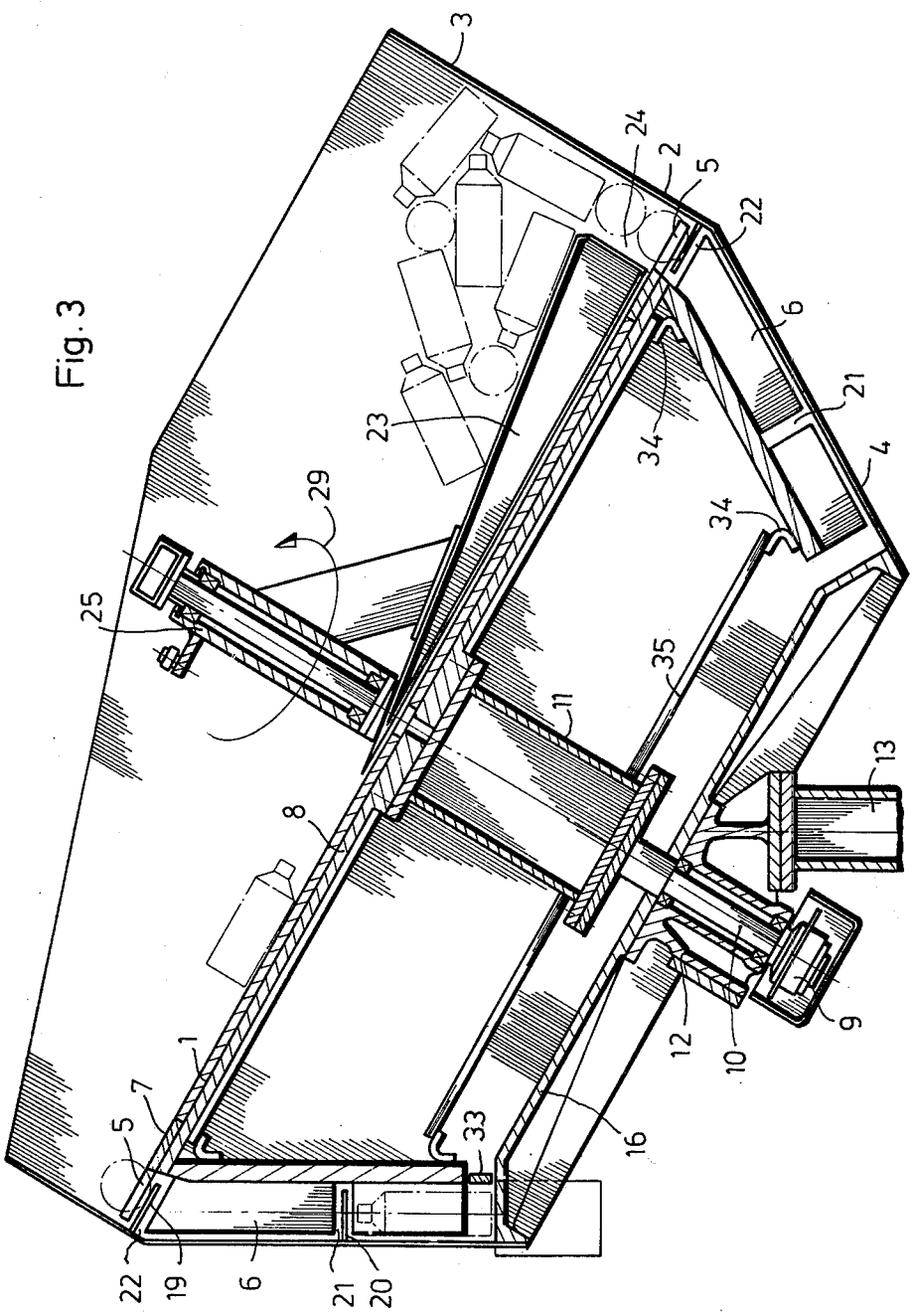
FIG. 3 is an enlarged sectional view taken through the axis of the apparatus of FIG. 1.
Figure 4:
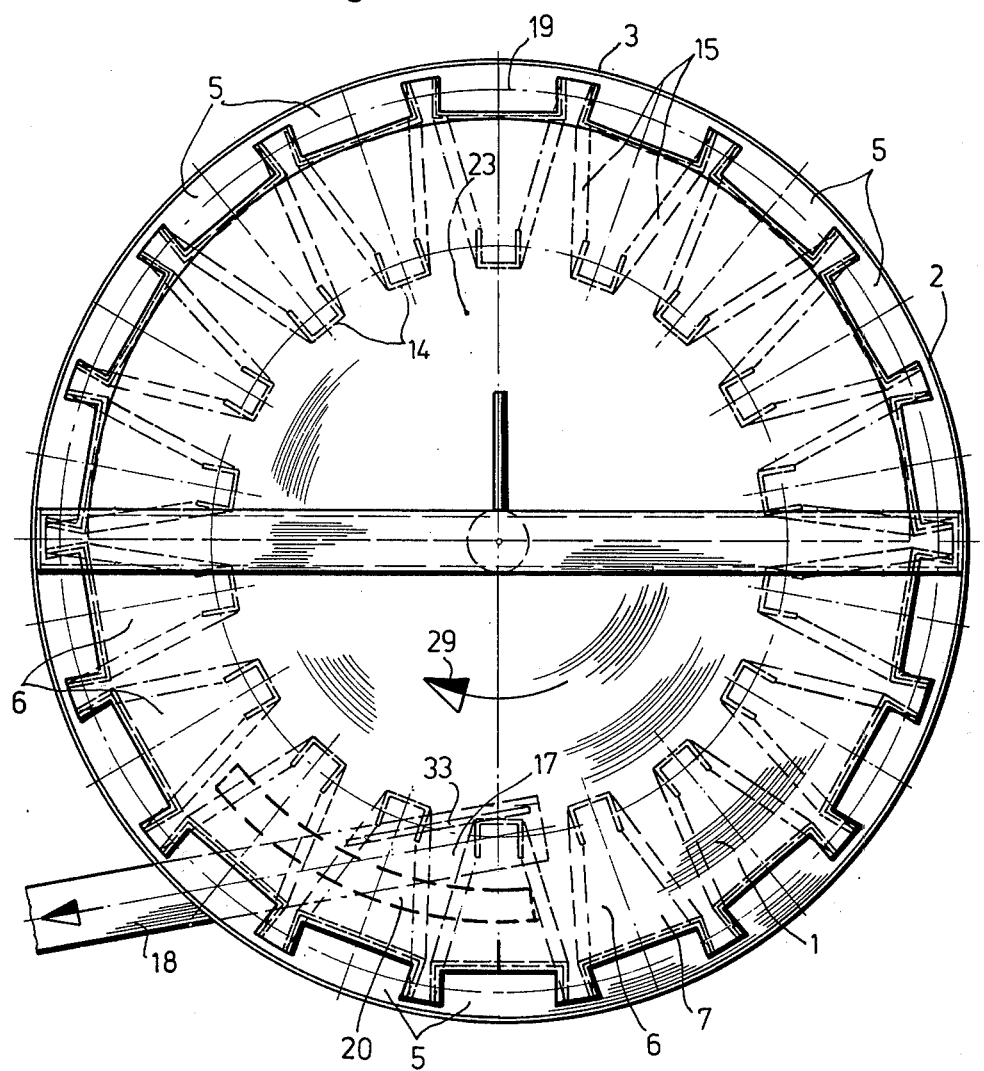
FIG. 4 is a top view of FIG. 3, taken in the direction of the axis of the rotating disc.

In accordance with the preferred apparatus illustrated herein and as best shown in FIG. 4, the circumference of rotating disc 1 is constituted by a ring of segments 7 each of which defines a respective opening 5, the segments being replacably mounted on the disc so that they may be exchanged for segments with different openings adapted for the handling of differently shaped articles, such as small or larger bottles, cans and other objects to be erected and aligned in a continuous operation. As illustrated in FIG. 3, support disc 8 exchangeably mounts the ring of segments 7 about disc 1 which is held on support disc 8 for co-rotation therewith.

As shown in FIGS. 1 and 3, a support base including upright 13 has affixed thereto bearing box 12 wherein drive shaft 10 is mounted for rotation by drive 9. Tubular shaft 11 is affixed to drive shaft 10 for rotation therewith, the tubular shaft supporting disc 8 and disc 1 for rotation in the direction of arrow 29 (see FIG. 4).

Each article transfer shaft 6 is defined by rear wall 14 and two side walls 15 converging towards the rear wall. The rear walls of all shafts 6 are arranged annularly about the axis of rotation of disc 1, the front wall of the shafts being constituted by the wall of funnel-shaped bottom housing portion 4. The shafts are affixed to the rotary structure, for instance by the illustrated fastening elements 34 affixing the upper and lower ends of rear walls 14 to supporting disc 8 and to lower supporting disc 35 respectively, the latter being mounted on drive shaft 10. In this manner, transfer shafts 6 are revolved around the axis of rotation during the rotation of disc 1. The bottom of shafts 6 is open to provide access to bottom wall 16 of housing portion 4. The bottom wall may either be affixed to bottom housing portion 4 to remain stationary or it may be keyed to the drive shaft of disc 1 for rotation with the disc and shafts 6. The latter mounting will be preferred for handling very sensitive articles, in which case it may not be sufficient to reduce friction by providing soft linings, such as carpeting or the like.

The height of transfer shafts 6 is so selected that they can hold at least one of the articles delivered randomly to housing 2 in an erected position, optimum efficiency being obtained if this height is sufficient to hold two superposed erected articles. An annular support plate 19 is affixed to the wall of upper housing portion 3 just below rotating disc 1, generally in the plane of support disc 8, the support plate being arranged to close the passage between respective openings 5 and their associated shafts 6. At the highest point of inclined disc 1 and support plate 19, the plate is interrupted or has a cut-out opening permitting communication between opening 5 and transfer shaft 6 at this point and so shaped as to enable the articles delivered to the apparatus to fall into the shaft wherethrough it is gravity-fed in erected position to bottom wall 16 whence it is subsequently transferred at 17 to conveyor 18. While bottle 26' is still standing on bottom wall 16, rotating disc 1 delivers subsequent bottle 26 to another support plate 20 affixed to the wall of lower housing portion 4 below support plate 19. Support plate 20 extends over an arc below the cut-out in support plate 19 above transfer point 17 and is spaced from plate 19 a distance sufficient to permit an erected article to be supported thereon. Side walls 15 of shafts 6 have respective slits 21 and 22 for receiving fixed support plates 19 and 20 as the transfer shafts revolve.

The inclination of disc 1 with respect to the horizontal depends primarily on the size, shape and nature of the articles to be erected and aligned, transfer point 17 from the disc to shaft 6 being located at the highest point of the disc, and the articles erected in the shafts being gravity fed therein to conveyor 18 whereon the erected articles are aligned in succession. The axis of shaft 6 must be perpendicular to assure proper transfer of the erected articles to the horizontal conveyor. Conveyor 18 runs substantially tangentially with respect to the direction of rotation of disc 1.

The lower part of disc 1 is covered by wedge-shaped bottom 23 which rises radially outwardly from the axis of rotation. Bottom 23 defines slot 24 with the wall of upper housing portion 3, which slot is in communication with openings 5 in the circumference of disc 1, thus providing an open passage at the lowest point or pit of the disc. As indicated in chain-dotted lines in FIG. 3, this arrangement serves to pre-sort the randomly delivered articles which fall through slot 24 and come to rest on support plate 19 in an aligned position in openings 5. To avoid positioning of the articles end-to-end and to place them successively into equidistantly spaced openings 5, eccenter or crank drive 25 is mounted on disc 1 and associated with wedge-shaped bottom 23 to reciprocate the bottom in a radial direction to close slot 24 between openings 5, the cranking of bottom 23 being synchronized with the rotation of disc 1 and bottom 23 being held against rotation.

FIGS. 5 to 8 illustrate successive stages of the erecting and aligning operation in connection with an embodiment of the apparatus designed for handling bottle 26. As shown in FIGS. 5 and 6, as inclined disc 1 is rotated in the direction of arrow 29 towards the highest point of the disc, the bottle remains lying horizontally on annular support plate 19 in opening 5, being further supported in the horizontal position by engagement of its neck portion 30 with the rim of opening 5. The length of the opening is substantially the same as that of the body of bottle 26, the opening being shaped to receive and hold the bottle on annular support plate 19 as disc 1 rotates thereover in the direction of arrow 29, with neck portion 30 projecting beyond opening 5 to engage the rim of the opening. As is indicated by FIGS. 7 and 8, in comparison with FIGS. 5 and 6, it is immaterial in what direction the bottles are held in openings 5, i.e. whether they point with neck portion 30 in the direction, or counter to the direction, of rotation of disc 1. As the disc continues to rotate to bring the bottle to the highest point of the disc, where annular support plate 19 is interrupted to open a passage into associated shaft 6, the bottle falls through the passage into the shaft, as indicated in FIG. 7. The converging side walls 15 of shaft 6 force the falling bottle to assume an erected position. As best shown in FIG. 4, at this point of the cut-out in annular support plate 19, subjacent arcuate support plate 20 extends into the shaft so that the erected bottle 26 will be supported thereon as the shaft passes over transfer point 17. At the end of plate 20, which need only be long enough to bridge over conveyor 18, the erected bottle will slide down the shaft until it rests on bottom 16 whereon this bottle 26' will be entrained by the continuously revolving transfer shaft 6 holding it until it has been returned to transfer point 17 where it is transferred to conveyor 18 while another bottle 26 falls into the transfer shaft and is supported on plate 20, this operation being continued to deliver a steady stream of bottles from the revolving transfer shafts 6 to conveyor 18. As shown in FIGS. 5 and 7, side walls 15 of shaft 6 converge to form a mouth dimensioned to hold bottle 26' in erected position on bottom wall 16 while transfer shafts 6 revolve.

FIGS. 9 to 16 show the erection and alignment of differently shaped articles, the embodiment of FIGS. 9–13 being designed for cans 27 which are open at one end while the embodiment of FIGS. 14 to 16 can handle a brush attached to a screw cap. Like reference numerals designate like parts operating in an equivalent manner in all embodiments to obviate redundancy in the description, only those parts differing from the first described embodiment which are designated by different numerals.

Figure 9:
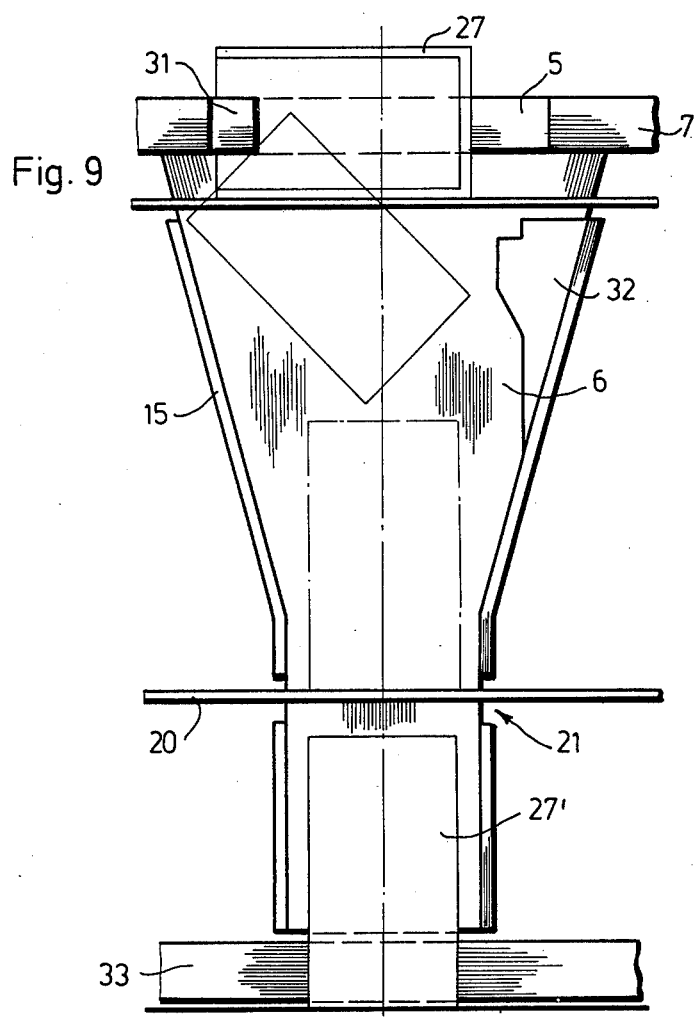
FIG. 9 is a view similar to that of FIG. 5 but showing a modified gravity transfer shaft adapted for handling open cans.
Figure 10:
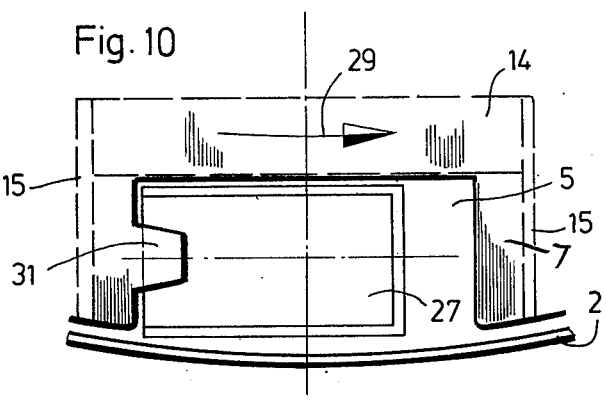
FIG. 10 is a top view of FIG. 9.

Referring first to FIGS. 9 to 13, a nose 31 projects into opening 5 in the direction of rotation 29 for engagement with can 27 which rests horizontally on support plate 19 in opening 5, in a manner described in connection with bottle 26. When can 27 is positioned with its open end facing in a direction opposite to the direction of rotation 29, as shown in FIGS. 9 and 10, nose 31 will project into the open end of the can and, as the passage between opening 5 and associated shaft 6 is opened, the inwardly projecting nose will force the can to fall into the shaft in erected position, with the open end on top. A nose 32 projects into the shaft from one of the side walls 15 thereof diametrically opposed to nose 31 and extending in a direction opposite to that of rotation 29 to enable an oppositely disposed can (see FIGS. 11 and 13) to fall into shaft 6 in erected position.

As in the previously described embodiment, tangentially extending guide 33 is mounted in alignment with rear wall 14 of shaft 6 at transfer point 17 to guide bottle 26' or can 27' from shaft 6 to conveyor 18 whereon the erected articles are aligned.

Shaft 6 of FIGS. 14 to 16 is shaped to receive and guide a specialty item 28, i.e. a brush attached to a cap, as used for cosmetic appliances, such as a nail polish applicator. To assure erection of this article as it falls from opening 5, wherein it is held in horizontal position, the shaft in this embodiment has an upper funnel-shaped portion and a lower cylindrical portion dimensioned to hold article 28 erect. Proper guidance of this article to conveyor 18 is assured by the arrangement of a pair of superposed guides 33 mounted in recesses in rear wall 14 of shaft 6.

The articles are transferred in their erected position in shaft 6 to conveyor 18 extending below the rotating shaft in horizontal alignment with a horizontal rim portion of bottom wall 16 (see FIG. 3).

The apparatus described hereinabove and illustrated in connection with certain now preferred embodiments thereof has the substantial advantage that it can handle bottles, cans and other elongated shaped articles of various sizes and shapes, adaptation of the apparatus to such different articles requiring only replacement of the circumferential disc edge segments with different openings. Furthermore, the articles are handled very gently in the apparatus while being erected and aligned in upright position so that it is possible to handle even small glass bottles and to handle various articles without damage to labels affixed thereto. Also, the articles are guided to the conveyor means in their upright position without any danger of falling over. In addition, the apparatus has few moving parts so that wear is reduced to a minimum.

The converging side walls of the shafts gravity feeding the erected articles to the narrow bottoms of the shafts improve the alignment of the successive erected articles so that they stand side-by-side at the transfer point to the conveyor. On the other hand, the tops of the shafts are wide enough to receive the falling articles as they change from their initial horizontal into the upright position. It is immaterial in what direction the articles face as they are evolved on the rotating disc to the zenith, the article always falling upright through the perpendicular shaft at the zenith. The apparatus works with a minimum of noise and its cost of manufacture is considerably less than that of apparatus of the same type heretofore used.

What we claim is:

1. An apparatus for erecting elongated shaped articles and for aligning the erected articles, which comprises
   (a) a housing defining an open top for randomly receiving a multiplicity of the elongated shaped articles,
   (b) a disc mounted in the housing for rotation about an inclined axis of rotation whereby the disc extends in a plane enclosing an angle with the horizontal and the rotating disc has a zenith and nadir, the disc having
      (1) a circumferential edge adjacent the housing and the edge defining openings capable of permitting the articles to pass therethrough, and
      (2) shafts accociated with the openings and descending therefrom,
   (c) a stationary annular support plate mounted in a plane immediately below the plane of the disc and in registry with the openings in the circumferential edge of the disc, the annular support plate defining
      (1) an opening at the zenith for permitting communication between a respective one of the openings in the circumferential disc edge and the shaft associated therewith,
      (2) the associated shaft at the zenith having a perpendicularly extending axis whereby the randomly received articles gravitate to the nadir, are revolved by the rotating disc to the zenith while supported in the openings on the annular support plate and pass sequentially through the opening at the zenith into the shaft while being erected therein, and
   (d) a generally horizontally extending elongated conveyor means for receiving the sequentially erected articles from the shaft at the zenith and for transporting them in alignment away from the shaft.

2. The apparatus of claim 1, further comprising a bottom wall for the shafts, the bottom wall having a horizontally extending portion for receiving the sequentially erected articles upright, and the housing having a cut-out for receiving the elongated conveyor means for extension to an article transfer point between the horizontally extending bottom wall portion and the conveyor means.

3. The apparatus of claim 2, wherein the bottom wall is affixed to the housing and is stationary.

4. The apparatus of claim 2, wherein the bottom wall is mounted for rotation with the disc.

5. The apparatus of claim 1, wherein the circumferential disc edge is comprised of a ring of like, replaceable segments each defining one of the openings and the openings being equidistantly spaced.

6. The apparatus of claim 1, further comprising an arcuate support plate below the annular support plate in the range of the opening at the zenith.

7. The apparatus of claim 1, further comprising a wedge-shaped bottom covering a lower part of the rotating disc and rising radially outwardly from the axis of rotation towards the nadir, the bottom being held against rotation in the lower part of the rotating disc and having a circumferential rim defining an arcuate slot with the housing, the randomly received articles gravitating into the slot and being aligned therein with the openings in the circumferential disc edge.

8. The apparatus of claim 1, further comprising guide means mounted between the shaft at the zenith and the conveyor means for guiding the sequentially erected articles in alignment to the conveyor means.

9. The apparatus of claim 1, wherein the elongated shaped articles are bottles having a main portion and a neck, each of the openings in the circumferential disc edge having a length corresponding to that of the main bottle portion.

10. The apparatus of claim 1, wherein the elongated shaped articles are open cans, further comprising a projection extending into each of the openings in the direction of rotation of the disc and a nose projecting into the associated shafts in the opposite direction.

* * * * *